United States Patent [19]
Kremidas

[11] Patent Number: 5,317,920
[45] Date of Patent: Jun. 7, 1994

[54] RESISTIVE STRAIN GAUGE PRESSURE SENSOR WITH INCREASED SENSITIVITY

[75] Inventor: James R. Kremidas, Fenton, Mich.

[73] Assignee: MacLean-Fogg Company, Mundelein, Ill.

[21] Appl. No.: 989,211

[22] Filed: Dec. 11, 1992

Related U.S. Application Data

[63] Continuation-in-part of Ser. No. 711,947, Jun. 7, 1992, Pat. No. 5,174,158.

[51] Int. Cl.⁵ .......................... G01L 7/08; G01L 9/06; G01L 13/02
[52] U.S. Cl. ........................................ 73/720; 73/721; 73/726; 73/727; 338/4
[58] Field of Search ................. 73/720, 721, 726, 727, 73/775, 776, 777, 756; 338/4; 29/621.1

[56] References Cited

U.S. PATENT DOCUMENTS

| | | | |
|---|---|---|---|
| 2,438,205 | 3/1948 | Coates | 201/63 |
| 3,184,962 | 5/1965 | Gay | 73/775 |
| 3,278,882 | 10/1966 | Love | 73/726 |
| 3,505,634 | 4/1970 | Von Vick | 338/4 |
| 3,993,939 | 11/1976 | Slavin et al. | 317/246 |
| 4,586,018 | 4/1986 | Bettman et al. | 73/720 |
| 4,600,912 | 7/1986 | Marks et al. | 73/720 |
| 4,672,354 | 6/1987 | Kurtz et al. | 73/727 |
| 4,711,130 | 12/1987 | Glas et al. | 73/708 |
| 5,028,394 | 7/1991 | Lowell, Jr. et al. | 73/775 |
| 5,174,158 | 12/1992 | Kremidas | 73/756 |

Primary Examiner—Donald O. Woodiel
Attorney, Agent, or Firm—Krass & Young

[57] ABSTRACT

A resistive strain gauge pressure sensor including upper and lower housings coacting to define a pressure chamber within the housing. A board member is clamped between the housings and defines a diaphragm portion which extends across the pressure chamber to divide the pressure chamber into upper and lower chamber portions. All of the circuitry of the sensor is screen printed onto the lower planar face of the board member including the various resistor elements of the strain gauge assembly, the various elements of the conditioning circuit receiving the output of the strain gauge assembly, and the various further leads required to connect the circuitry elements to the terminals of the sensor. The sensor terminals are provided by a plurality of connector pins extending downwardly through the board member for connection at their respective lower ends to the circuitry provided on the lower face of the board member. Each resistor element of the strain gauge assembly is screen printed onto a pad which is screen printed onto the diaphragm portion. The pads increase the strain experience by the resistors in response to a given deflection of the diaphragm and thereby increase the sensitivity of the sensor to a given pressure differential applied across the diaphragm.

12 Claims, 6 Drawing Sheets

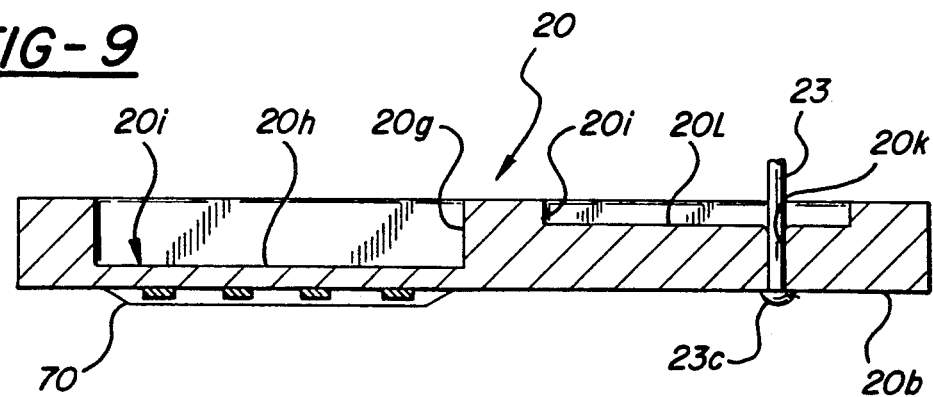
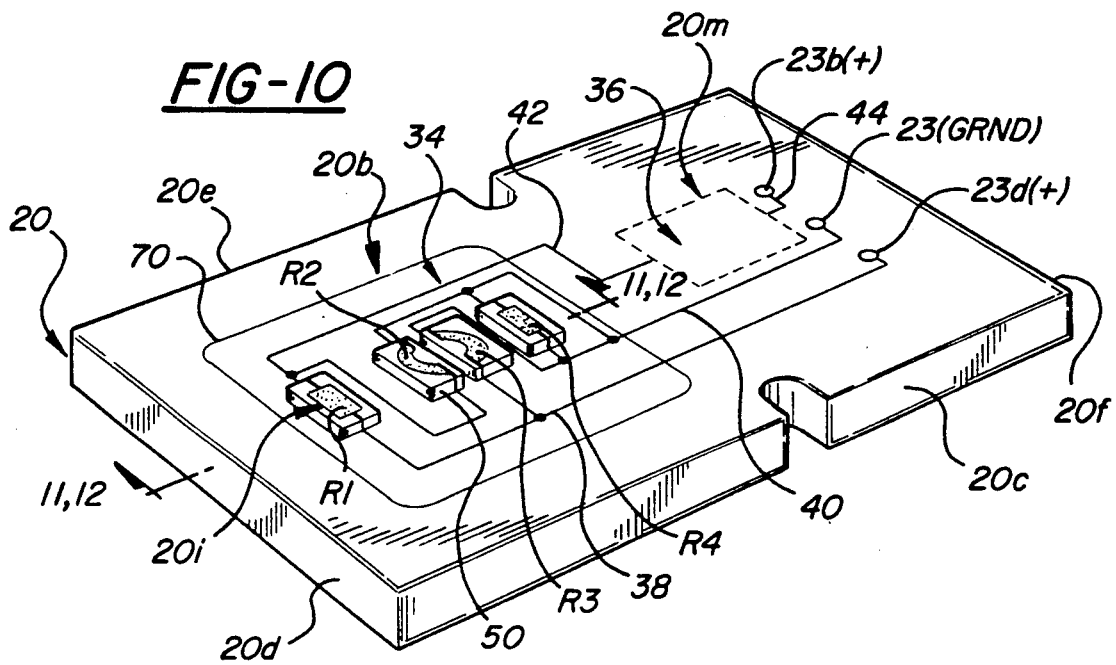
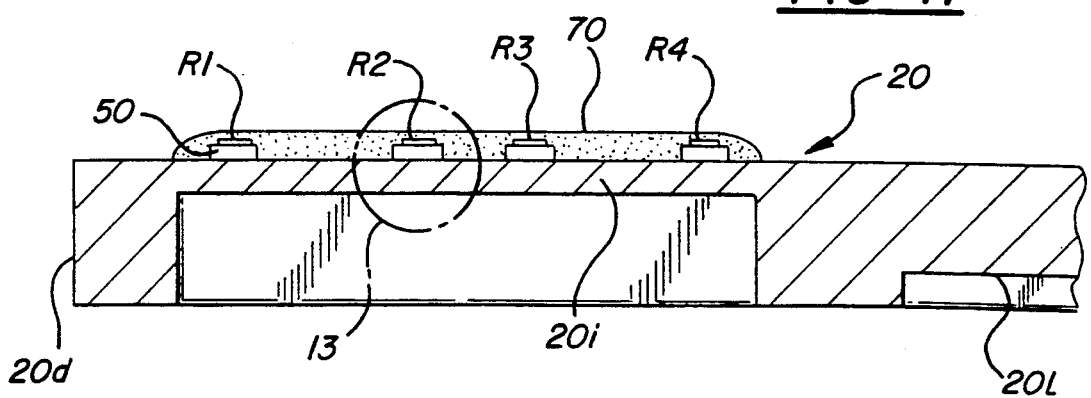

RESISTIVE STRAIN GAUGE PRESSURE SENSOR WITH INCREASED SENSITIVITY

RELATED APPLICATION

This application is a continuation-in-part of U.S. patent application Ser. No. 711,947 filed on Jun. 7, 1992, U.S. Pat. No. 5,174,158.

BACKGROUND OF THE INVENTION

This invention relates to pressure transducers and more particularly to resistive strain gauge pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a resistive strain gauge sensor in which the pressure is sensed and measured based on dimensional changes in strain gauges which generate proportional changes in the resistance of the gauge.

Whereas many types of resistive strain gauge pressure sensors have been designed and made commercially available, and whereas the various resistive strain gauge sensors have proven to be generally satisfactory, these prior art gauges have tended to be rather expensive, both in terms of labor and material, and have exhibited limited sensitivity in terms of generating a usable output signal for a given pressure differential.

SUMMARY OF THE INVENTION

This invention is directed to the provision of a resistive strain gauge pressure sensor having a simple, inexpensive, and effective design.

More specifically, this invention is directed to the provision of a resistive strain gauge pressure sensor providing increased sensitivity.

The invention pressure sensors of the type including a generally planar diaphragm and a plurality of strain gauge resistors arranged in spaced relation on the diaphragm surface and operative in response to flexing of the diaphragm to generate a strain gauge output signal in strain gauge circuitry associated with the resistors. According to the invention, at least one of the resistors is positioned on a pad positioned on the diaphragm surface so that the resistor is raised above the surface of the diaphragm. This arrangement has the effect of increasing the strain experienced by the resistor in response to a given deflection of the diaphragm to thereby make the gauge more sensitive to a given pressure differential experienced by the diaphragm.

In the disclosed embodiment of the invention, the pad is formed of a glass material; the pad is applied to the surface of the diaphragm in a screen printing operation; and the pad has a thickness less than the thickness of the diaphragm but greater than the thickness of the resistor. For example, the pad may have a thickness of between 0.001 and 0.005 inches, the diaphragm may have a thickness of between 0.012 and 0.015 inches, and the resistor may have a thickness of between 0.0005 and 0.0008 inches.

BRIEF DESCRIPTION OF THE DRAWINGS

FIG. 9 is a cross-sectional view taken on line 9—9 of FIG. 8;

FIG. 10 is a perspective view showing the bottom of the board member;

FIGS. 11 and 12 are cross-sectional views taken on lines 11—11 and 12—12 of FIG. 10;

DETAILED DESCRIPTION OF THE PREFERRED EMBODIMENTS

Figure 1:
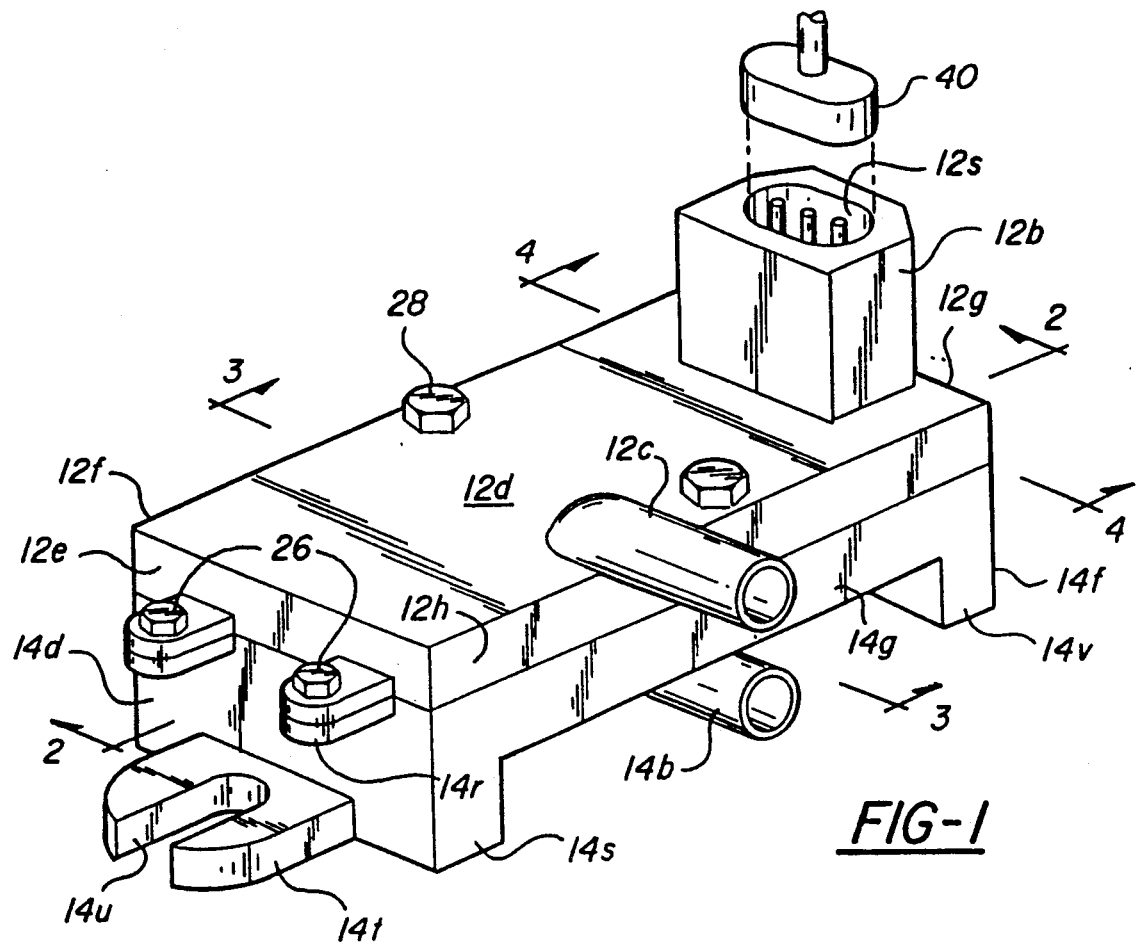
FIG. 1 is a perspective view of a sensor according to the invention.
Figure 2:
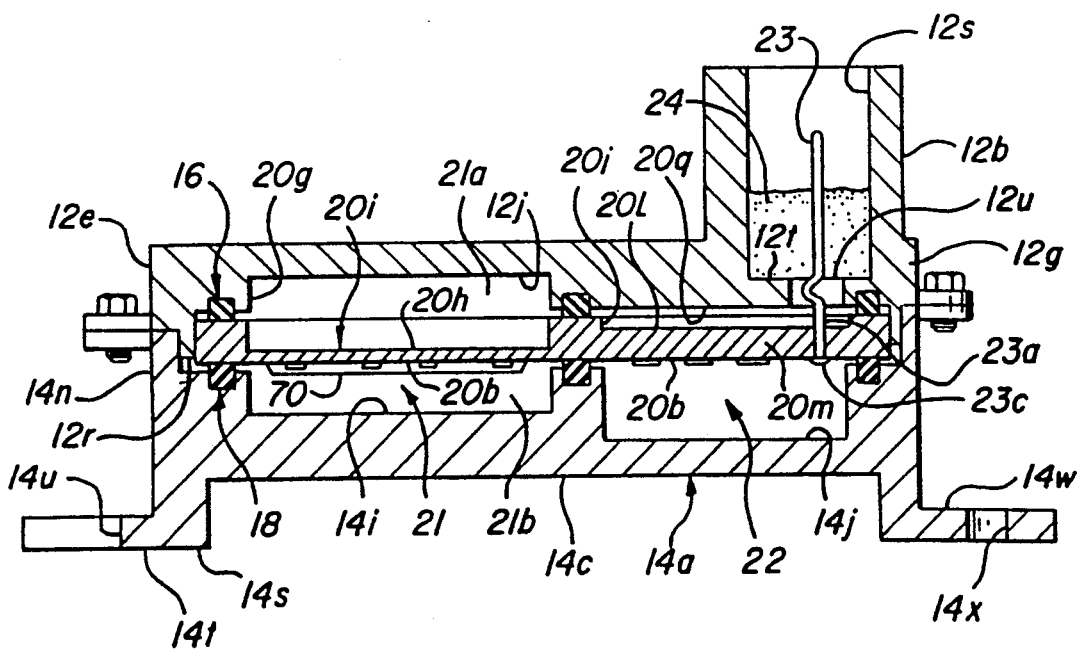
FIGS. 2, 3, and 4 are cross-sectional views taken respectively on lines 2—2, 3—3 and 4—4 of FIG. 1.
Figure 3:
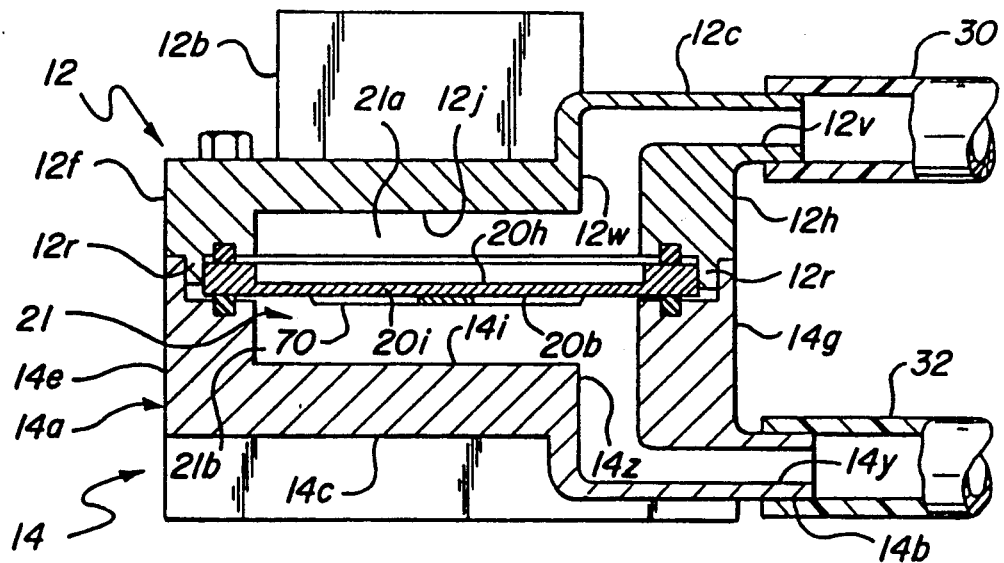
Figure 4:
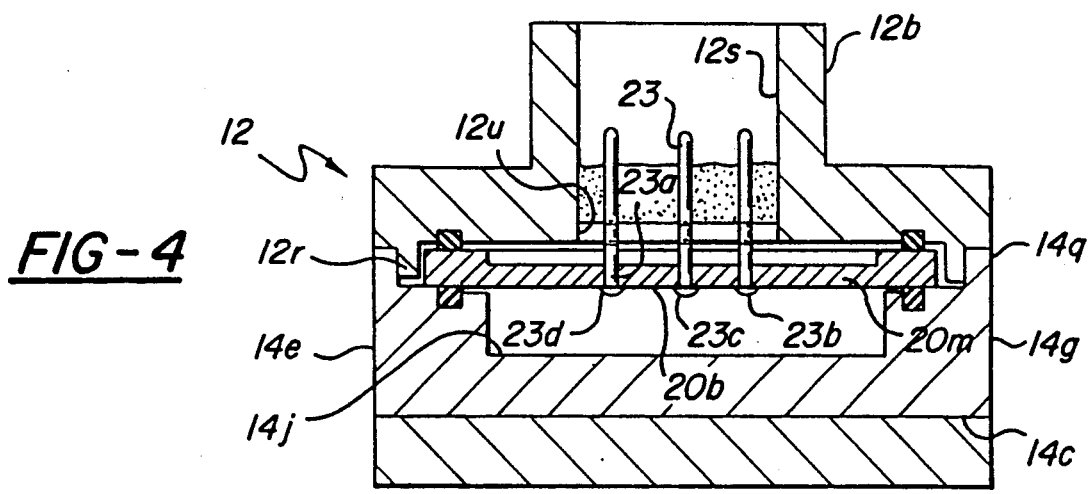
Figure 6:
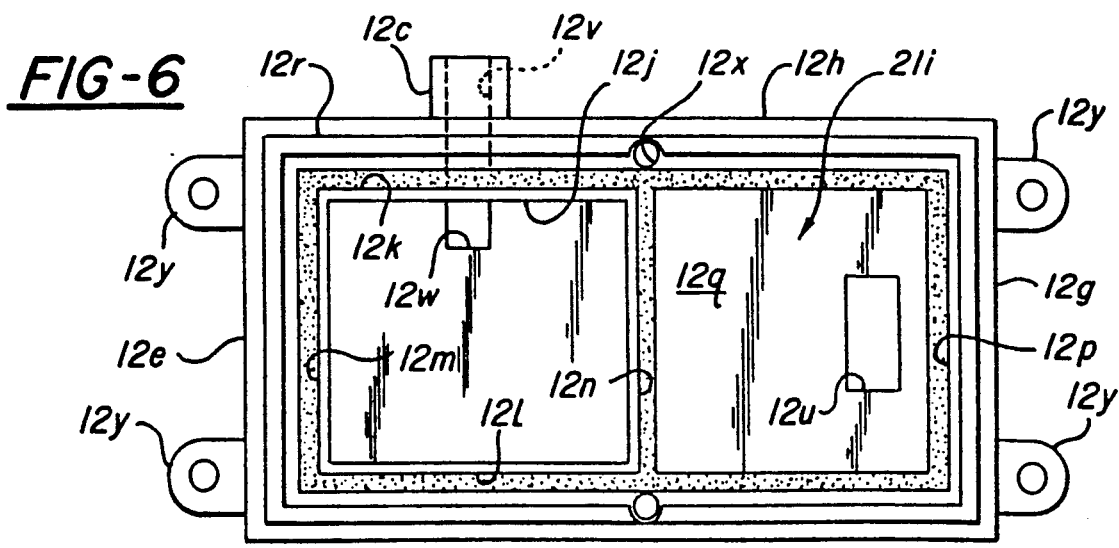
FIG. 6 is a bottom view of an upper housing employed in an invention sensor.
Figure 5:
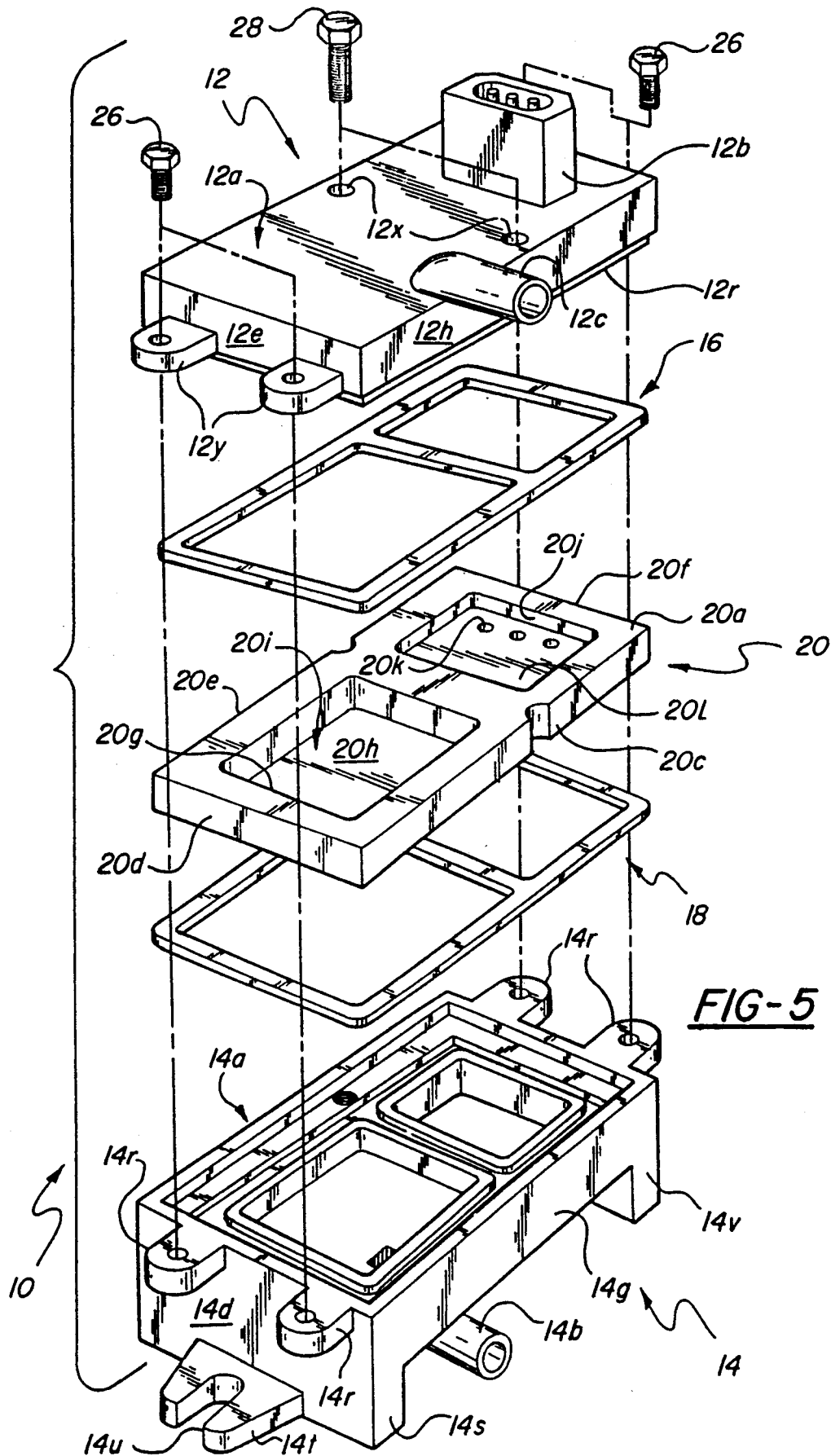
FIG. 5 is an exploded perspective view of the invention sensor.
Figure 7:
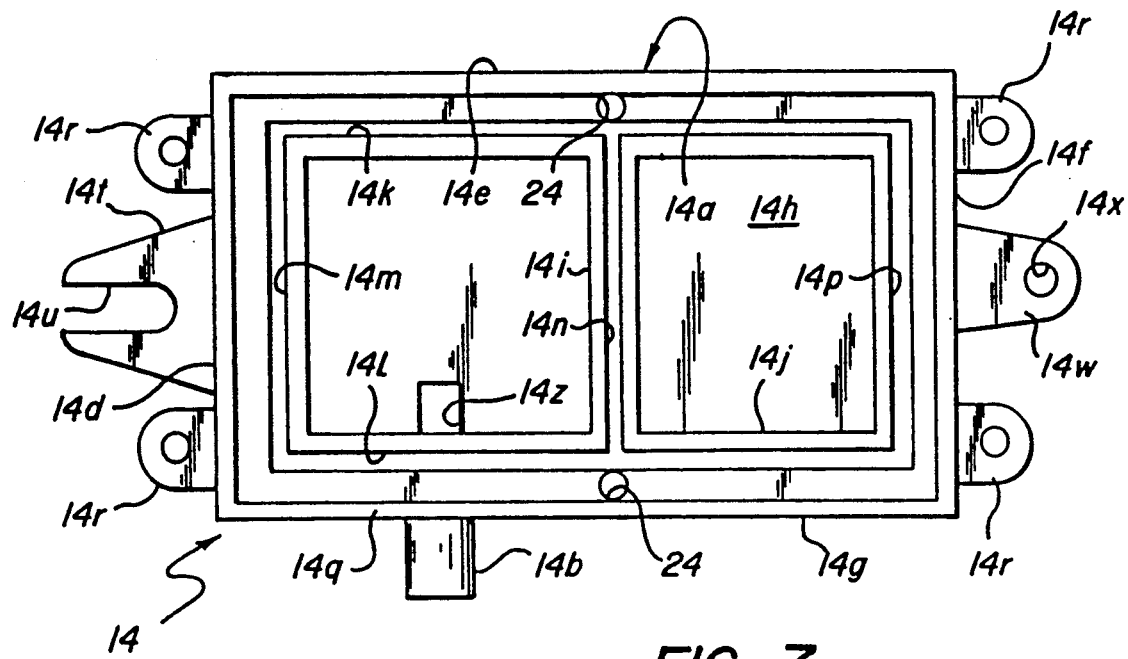
FIG. 7 is a top view of a bottom housing employed in the invention sensor.
Figure 8:
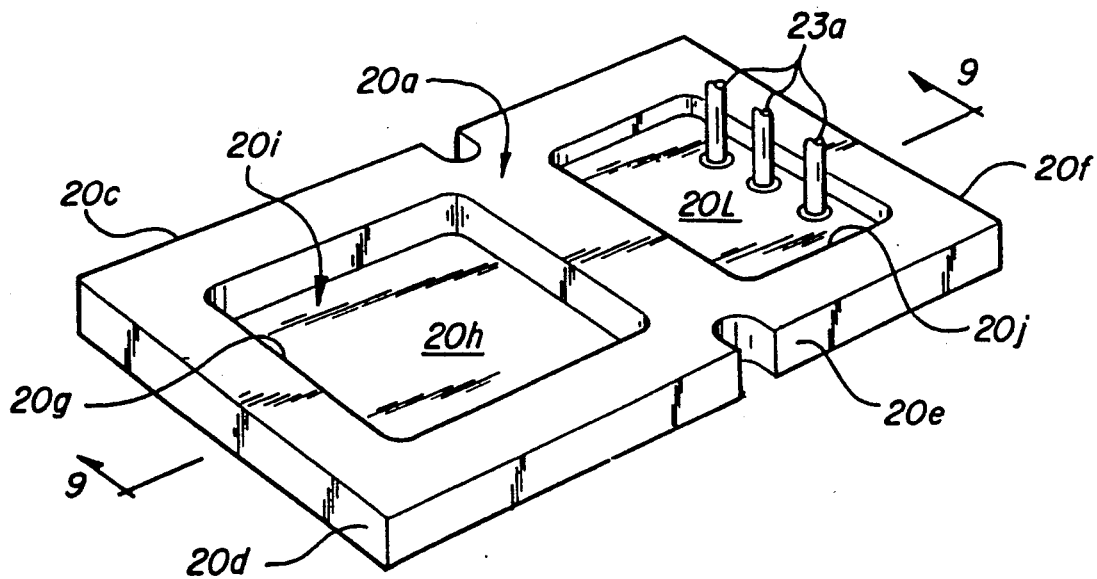
FIG. 8 is a perspective view of a board member employed in the invention sensor.

The invention sensor, broadly considered, includes an upper housing 12, a lower housing 14, an upper seal 16, a lower seal 18, and a board member assembly 20.

Upper housing 12 is formed of a suitable material such, for example as aluminum or a suitable plastic, and includes a main body portion 12a, an upstanding socket or receptacle portion 12b, and a conduit or tube portion 12c.

Main body portion 12a includes an upper generally planar surface 12d, side edges 12e, 12f, 12g and 12h, and a lower surface generally indicated at 12i. Lower face 12i includes a rectangular downwardly opening cavity 12j and a seal groove including longitudinal portions 12j and 12l connected by transverse portions 12m, 12n and 12p. Seal portions 12k, 12l, 12m and 12n coact to define a generally rectangular groove configuration surrounding rectangular cavity 12j and seal portions 12k, 12l, 12n and 12p coact to define a generally rectangular groove configuration surrounding a rectangular area 12q forming a portion of the lower surface 12i of the upper housing. A downwardly extending flange 12r extends around the perimeter of the lower surface 12i of the upper housing in surrounding relation to the seal groove and in surrounding relation to cavity 12j and area 12q.

Socket portion 12b upstands from upper surface 12d proximate side edge 12g of the housing and defines a cavity 12s which terminates in a lower wall 12t in which is formed a rectangular opening 12u opening at its lower end in the area 12q on the lower face 12i of the housing.

Tube portion 12c upstands from upper surface 12d proximate side edge 12h and in transverse alignment with cavity 12j and defines a central passage 12v which opens in cavity 12j at 12w.

Upper housing 12 further includes bores 12x extending through the housing and spaced lugs 12y at the opposite ends of the housing.

Lower housing 14 is also formed of a material such as aluminum or plastic and includes a main body portion 14a and a conduit or tube portion 14b.

Main body portion 14a includes a lower generally planar surface 14c, side edges 14d, 14e, 14f, and 14g, and an upper surface indicated generally at 14h. Upper surface 14h defines a relatively shallow rectangular cavity 14i corresponding in size and configuration to the cavity 12j in the lower surface of the upper housing, a relatively deep rectangular cavity 14j, and a seal groove including longitudinal groove portions 14k, 14l, 14n, and 14p. Seal portions 14k, 14l, 14m, and 14n are disposed in surrounding relation to cavity 14i and seal portions 14l, 14m, 14n, and 14p are disposed in surrounding relation to cavity 14h. Cavity 14j will be seen to correspond in size and configuration to the area 12q on the lower surface of the upper housing. The main body portion of the lower housing further includes an upwardly extending flange portion 14q extending around the periphery of the upper face of the housing, spaced lug pairs 14r at either end of the housing, a flange portion 14s at one end of the housing terminating in a mounting flange 14t defining a U-shaped mounting opening 14u, and a mounting flange 14v at the other end of the housing terminating in a mounting flange 14w defining a mounting hole 14x.

Conduit or tube portion 14b downstands from lower surface 14c proximate side edge 14g and in transverse alignment with cavity 14i and defines a central passage 14y opening at 14z in the lower face of cavity 14i.

Upper and lower seals 16 and 18 are identical, are formed, for example, of silicone, and are sized and configured to seat respectively in groove 12k–12p in the lower surface of the upper housing 12 and in groove 14k–14p in the upper surface of the lower housing 14.

Board member 20 is formed of a suitable dielectric material such as alumina and has a generally block-like rectangular configuration defined by an upper surface 20a, a lower surface 20b, and side edges 20c, 20d, 20e, and 20f. A generally rectangular cavity 20g is formed in the upper surface 20a of the board member corresponding in size and configuration to cavities 12j and 14j formed respectively in the upper and lower housings. Cavity 20g has a depth relative to the total thickness of the board member such that the lower face 20h of the cavity coacts with the lower surface 20b of the board member to define a relatively thin flexible diaphragm portion 20i of the board member of generally rectangular configuration corresponding in size and configuration to the cavities 12j, 20g and 14j.

A further cavity 20j is formed in the upper surface 20a of the board member. Cavity 20j has a size and configuration generally corresponding to the size and configuration of the cavity 14j in the lower housing and includes three spaced bores or openings 20k. Cavity 20j is significantly shallower than cavity 20g so that the lower surface 20l of cavity 20j coacts with the lower surface 20b of the board member to define a relatively thick mounting portion 20m through which the bores 20k extend.

Board member 20 will thus be seen to comprise a relatively thin diaphragm portion 20h and a relatively thick substrate portion comprising the mounting portion 20m and the annular board portions surrounding the diaphragm portion 20i and the mounting portion 20m.

In the assembled relation of the sensor, the board member 20 is clamped around its perimeter between upper housing 12 and lower housing 14 with the flange 14n on the lower housing telescopically receiving the flange 12r on the upper housing and with the housings coacting to define a pressure chamber 21 constituted by cavities 12j and 14i and an instrumentation chamber 22 defined between the lower face of cavity 14j and area 12q on the lower face of the upper housing; the outer perimeter of the board member is seated snugly within the inner perimeter defined by flange 12r; the diaphragm portion 20i of the board member extends across the pressure chamber 21 to divide the pressure chamber 21 into an upper pressure chamber portion 21a above the diaphragm portion and a lower pressure chamber portion 21b below the diaphragm portion; a plurality of connector pins or terminals 23 are positioned in spaced relation within the cavity 12s of socket portion 12b of the upper housing and extend downwardly through a suitable insulating material 24 positioned within cavity 12s and pass at their lower ends 23a through opening 12u and through a respective bore 20k in the mounting portion 20m of the board member to position their respective lower tips 23b, 23c, and 23d in proximity to the planar underface 20b of the board member; upper and lower seals 16 and 18 are sealed in their respective grooves and respectively engage the upper and lower faces of the board member to sealingly isolate the board member from the exterior of the sensor and to sealingly isolate pressure chamber 21 from instrumentation chamber 22; bolts 26 pass downwardly through holes in lugs 12y for threaded engagement with threaded bores in lugs 14r to maintain the upper and lower housings in tightly coupled relation with the board member clamped therebetween; and further bolts 28 extend downwardly through holes 12z in the upper housing member for threaded engagement with threaded bores 24 in the lower housing 14 to supplement the clamping action of the bolts 26.

It will be understood that, in use, the sensor is suitably secured to a support surface utilizing flange U opening 14u and flange mounting hole 14x and hoses 30 and 32 are respectively fitted over tube portions 12c and 14b of the respective housings to communicate the gas or fluid pressures in hoses 30 and 32 respectively with the upper and lower faces of the diaphragm portion of the board member so as to produce selected deflection of the diaphragm portion in proportion to the pressure differential between the fluid pressures in upper and lower pressure chamber portions 21a and 21b as transmitted by hoses 30 and 32.

As best seen in FIG. 10, the upper planar surface 20b of member 20 is provided with a resistive strain gauge assembly 34 and a conditioning circuit 36. Specifically, strain gauge assembly 34 is provided on planar surface 20b in underlying relation to diaphragm portion 20i and conditioning circuit 36 is provided on planar surface 20b in underlying relation to mounting portion 20m.

Strain gauge assembly 34 includes strain gauge resistors R1, R2, R3 and R4 which are distributed over the area of diaphragm portion 20i in a manner such that, with a given deflection of the diaphragm portion, certain of the resistors experience elongation and certain of the resistors experience compression. Specifically, resistors R1 and R4, by virtue of their positions proximate the perimeter of the diaphragm portion, will experience compression in response to upward deflection of the diaphragm portion and elongation in response to downward deflection of the diaphragm portion and resistors R2 and R3, by virtue of their positions proximate the central region of the diaphragm portion, will experience corresponding elongation in response to upward deflection of the diaphragm portion and corresponding compression in response to downward deflection of the diaphragm portion.

The terminals provided by the lower ends 23b, 23c, and 23d of the connector pins 23 comprise a central common ground terminal 23c flanked by positive terminals 23b and 23d. Ground terminal 23c and positive terminal 23b coact to provide an input voltage to the strain gauge assembly via leads 38 and 40. The strain gauge will be seen to be arranged in a well-known Wheatstone Bridge configuration with an output lead 42 transmitting the output voltage of the strain gauge assembly to conditioning circuit 36. Conditioning circuit 36 will be understood to include various circuit elements to modulate the output signal of the strain gauge assembly. Circuit 36 may include, for example, printed resistors for adjusting and balancing the circuit and for temperature compensation; discrete IC amplifiers to amplify the strain gauge output; discrete diodes for temperature compensation; and discrete capacitors for filtering out unwanted high response noise. The conditioned output signal is thereafter transmitted to the positive terminal 23b via a lead 44 so that, with a suitable power plug 40 plugged into socket 12b for coaction with the connector pins 23, and in response to the generation of a differential pressure across the diaphragm portion 20i of the board member, an output voltage appears across the ground terminal 23c and positive terminal 23b which is proportional to the differential in pressure being experienced by the diaphragm portion.

Figure 12:
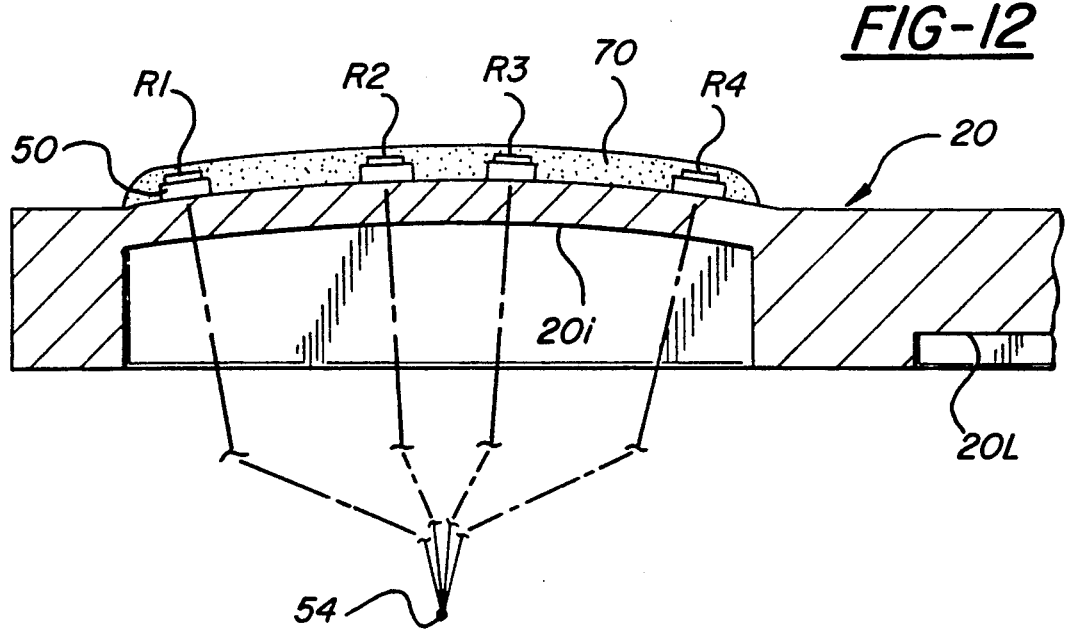
Figure 13:
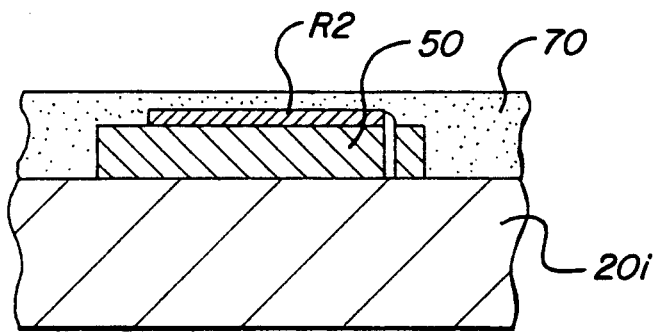
FIG. 13 is a detail view taken within the circle 13 of FIG. 11.
Figure 14:
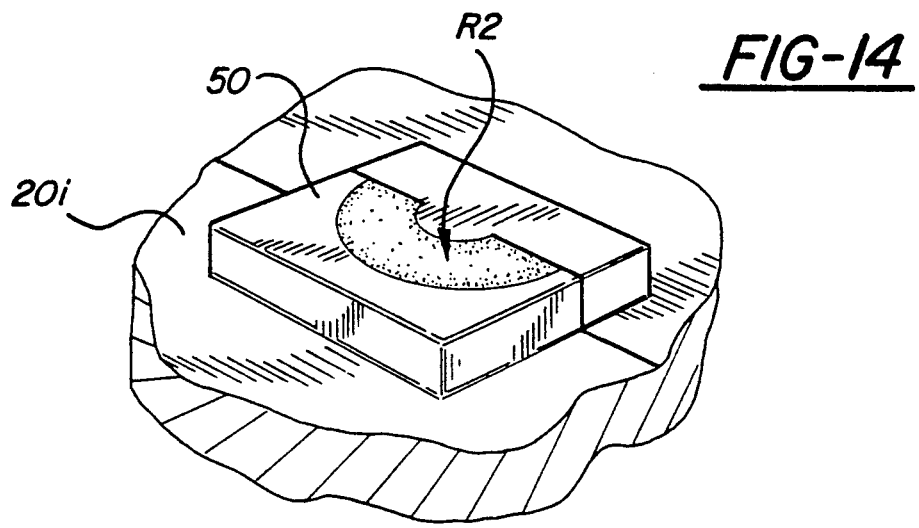
FIG. 14 is a fragmentary perspective view of the detail shown in FIG. 13.

With reference to FIGS. 11-14, it will be seen that each resistor R1, R2, R3 and R4 is mounted on the surface of diaphragm portion 20i utilizing a pad 50. Each pad 50 is preferably formed of a suitable glass material and is applied to the surface of the diaphragm in a screen printing operation. Following the screen printing of the pads 50 on the surface of the diaphragm the resistors R1, R2, R3 and R4 are screen printed on the tops of the respective pads.

For a diaphragm having a thickness of between 0.012 and 0.015 inches, each pad 50 may have a thickness for example of between 0.001 and 0.005 inches and each resistor R1, R2, R3 and R4 may have a thickness of between 0.0005 and 0.0008 inches. Each pad preferably defines a mounting area for the respective resistor that is greater than the area of the resistor so that the pad surface area is provided totally around the periphery of the respective resistor.

Pads 50 have the effect of increasing the strain experienced by the respective resistor in response to a given deflection of the diaphragm since the pad 50 has the effect of placing the respective resistor further away from the center of curvature 54 of the diaphragm deflection. The pads 50 therefore increase the magnitude of the electrical strain gauge output for a given diaphragm deflection and thereby increase the sensitivity of the sensor to a given pressure differential applied across the diaphragm.

The circuitry on the lower face of the board member assembly, with the exception of the discrete circuit components, is preferably carried out in a multi-step thick film screen printing operation in which first the pads are screen printed on the surface of the diaphragm portion, then the conductors are screen printed utilizing gold, platinum or silver material, then the resistors (other than the strain gauge resistors) are screen printed utilizing suitable resistive material, and then the strain gauge resistors are screen printed on the pads.

The screen printing is accomplished utilizing a screen and a wiper or squeegee wherein the screen is mounted in a peripheral frame and is held in a position over and slightly spaced above the surface of the diaphragm. The screen is prepared by suitably plugging the screen mesh with the exception of screen apertures corresponding in size and positioning to the particular items (for example, the resistors or the pads) to be printed so that when a supply of ink is positioned on the upper face of the screen and the wiper is moved over the screen in a single linear unidirectional movement, the ink is uniformly applied to the upper face of the diaphragm as the ink is distributed through the openings in the screen by the wiper, with the wiper simultaneously moving the screen downwardly into contact with the upper face of the diaphragm to ensure a positive interaction as between the screen and the diaphragm. Further details of the manner in which the screen printing operations may be accomplished are disclosed in applicant's copending U.S. patent application Ser. No. 808157, filed Dec. 13, 1991.

After the screen printing has been completed, a layer or thick film 70 of a dielectric glass material is suitably applied at least over the strain gauge assembly 34 as a protective coating for the strain gauge assembly. Coating 70 hermetically seals the strain gauge elements to insulate the strain gauge elements from the media whose pressure is being measured and to encapsulate the strain gauge elements in a common material to ensure a consistent coefficient of thermoexpansion throughout the strain gauge.

The invention will be seen to provide an extremely simple and extremely inexpensive resistive strain gauge sensor wherein the resistors of the strain gauge assembly are selectively raised above the surface of the diaphragm surface to increase the strain experienced by the resistors in response to a given diaphragm deflection and thereby increase the sensitivity of the sensor to a given pressure differential applied across the diaphragm.

Whereas a preferred embodiment of the invention have been illustrated and described in detail, it will be apparent that various changes may be made in the disclosed embodiment without departing from the scope or spirit of the invention.

I claim:

1. A resistive strain gauge pressure sensor including a generally planar diaphragm and a plurality of strain gauge resistors arranged in spaced relation on the diaphragm and operative in response to flexing of the diaphragm to generate a strain gauge output signal in strain gauge circuitry associated with the resistors, characterized in that at least one of said resistors is positioned on a pad positioned on a diaphragm surface so that the resistor is raised above the surface of the diaphragm to increase the strain experienced by the resistor in response to a given deflection of the diaphragm, the pad having a thickness less than the thickness of the diaphragm but greater than the thickness of the resistor.

2. A resistive strain gauge differential pressure sensor including a housing defining a pressure chamber, a diaphragm extending across the chamber to divide the chamber into an upper chamber portion in communication with a first fluid pressure and a lower chamber portion in communication with a second fluid pressure and a resistive strain gauge assembly positioned on the diaphragm and operative in response to flexing of the diaphragm to generate an output signal proportional to the pressure differential between the upper and lower chamber portions, characterized in that the strain gauge assembly includes a plurality of pads arranged in spaced relation on the surface of the diaphragm and a corresponding plurality of resistors positioned respectively on said pads, the pads having a thickness less than the thickness of the diaphragm but greater than the thickness of the resistors.

3. A transducer comprising:
a housing defining a chamber;
a board member defining a relatively thin diaphragm portion;
means mounting said board member in said housing with said diaphragm portion extending across said chamber to divide said chamber into an upper chamber portion above said diaphragm portion; and
a resistive strain gauge assembly positioned on said diaphragm portion and including a plurality of pads arranged in spaced relation on the surface of the diaphragm portion and a corresponding plurality of resistors positioned respectively on said pads, the pads having a thickness less than the thickness of the diaphragm portion but greater than the thickness of the resistors.

4. A resistive strain gauge pressure sensor including a generally planar diaphragm and a plurality of strain gauge resistors arranged in spaced relation on the diaphragm and operative in response to flexing of the diaphragm to generate a strain gauge output signal in strain gauge circuitry associated with the resistors, characterized in that each of the resistors is positioned on an individual dielectric pad positioned in spaced relation on the diaphragm surface so that the resistors are raised above the surface of the diaphragm to increase the strain experienced by the resistors in response to a given deflection of the diaphragm, the resistors are electrically interconnected by a plurality of conductors bonded to the diaphragm surface to form a strain gage circuit on the diaphragm surface, and the pads have a thickness several times the thickness of the resistors.

5. A resistive strain gauge pressure sensor including a generally planar diaphragm and a plurality of strain gauge resistors arranged in spaced relation on the diaphragm and operative in response to flexing of the diaphragm to generate a strain gauge output signal in strain gauge circuitry associated with the resistors, characterized in that each of the resistors is positioned on an individual dielectric pad positioned in spaced relation on the diaphragm surface so that the resistors are raised above the surface of the diaphragm to increase the strain experienced by the resistors in response to a given deflection of the diaphragm, the resistors are electrically interconnected by a plurality of conductors bonded to the diaphragm surface to form a strain gage circuit on the diaphragm surface, the pads have a thickness of between 0.001 and 0.005 inches, and the diaphragm has a thickness of between 0.012 and 0.015 inches.

6. A resistive strain gauge pressure sensor including a generally planar diaphragm and a plurality of strain gauge resistors arranged in spaced relation on the diaphragm and operative in response to flexing of the diaphragm to generate a strain gauge output signal in strain gauge circuitry associated with the resistors, characterized in that each of the resistors is positioned on an individual dielectric pad positioned in spaced relation on the diaphragm surface so that the resistors are raised above the surface of the diaphragm to increase the strain experienced by the resistors in response to a given deflection of the diaphragm, the resistors are electrically interconnected by a plurality of conductors bonded to the diaphragm surface to form a strain gage circuit on the diaphragm surface, the pads have a thickness of between 0.001 and 0.005 inches, and the resistors have a thickness of between 0.005 and 0.008 inches.

7. A resistive strain gauge differential pressure sensor including a housing defining a pressure chamber, a diaphragm extending across the chamber to divide the chamber into an upper chamber portion in communication with a first fluid pressure and a lower chamber portion in communication with a second fluid pressure and a resistive strain gauge assembly positioned on the diaphragm and operative in response to flexing of the diaphragm to generate an output signal proportional to the pressure differential between the upper and lower chamber portions, characterized in that the strain gauge assembly includes a plurality of pads arranged in spaced relation on the surface of the diaphragm and corresponding plurality of resistors positioned respectively on said pads, and the pads have a thickness several times the thickness of the resistors.

8. A resistive strain gauge differential pressure sensor including a housing defining a pressure chamber, a diaphragm extending across the chamber to divide the chamber into an upper chamber portion in communication with a first fluid pressure and a lower chamber portion in communication with a second fluid pressure and a resistive strain gauge assembly positioned on the diaphragm and operative in response to flexing of the diaphragm to generate an output signal proportional to the pressure differential between the upper and lower chamber portions, characterized in that the strain gauge assembly includes a plurality of pads arranged in spaced relation on the surface of the diaphragm and corresponding plurality of resistors positioned respectively on said pads, the pads have a thickness of between 0.001 and 0.005 inches, and the diaphragm has a thickness of between 0.012 and 0.015 inches.

9. A resistive strain gauge differential pressure sensor including a housing defining a pressure chamber, a diaphragm extending across the chamber to divide the chamber into an upper chamber portion in communication with a first fluid pressure and a lower chamber portion in communication with a second fluid pressure and a resistive strain gauge assembly positioned on the diaphragm and operative in response to flexing of the diaphragm to generate an output signal proportional to the pressure differential between the upper and lower chamber portions, characterized in that the strain gauge assembly includes a plurality of pads arranged in spaced relation on the surface of the diaphragm and corresponding plurality of resistors positioned respectively on said pads, the pads have a thickness of between 0.001 and 0.005 inches, and the resistors have a thickness of between 0.005 and 0.008 inches.

10. A transducer comprising:
a housing defining a chamber;
a board member defining a relatively thin diaphragm portion;
means mounting said board member in said housing with said diaphragm portion extending across said chamber to divide said chamber into an upper chamber portion above said diaphragm portion; and
a resistive strain gauge assembly positioned on said diaphragm portion and including a plurality of pads arranged in spaced relation on the surface of the diaphragm portion and a corresponding plurality of resistors positioned respectively on said pads, the pads having a thickness several times the thickness of the resistors.

11. A transducer comprising:

a housing defining a chamber;

a board member defining a relatively thin diaphragm portion;

means mounting said board member in said housing with said diaphragm portion extending across said chamber to divide said chamber into an upper chamber portion above said diaphragm portion; and a resistive strain gauge assembly positioned on said diaphragm portion and including a plurality of pads arranged in spaced relation on the surface of the diaphragm portion and a corresponding plurality of resistors positioned respectively on said pads, the pads having a thickness of between 0.001 and 0.005 inches, and the diaphragm portion having a thickness of between 0.012 and 0.015 inches.

12. A transducer comprising:

a housing defining a chamber;

a board member defining a relatively thin diaphragm portion;

means mounting said board member in said housing with said diaphragm portion extending across said chamber to divide said chamber into an upper chamber portion above said diaphragm portion; and a resistive strain gauge assembly positioned on said diaphragm portion and including a plurality of pads arranged in spaced relation on the surface of the diaphragm portion and a corresponding plurality of resistors positioned respectively on said pads, the pads having a thickness of between 0.001 and 0.005 inches and the resistors having a thickness of between 0.005 and 0.008 inches.

* * * * *

UNITED STATES PATENT AND TRADEMARK OFFICE
CERTIFICATE OF CORRECTION

PATENT NO. : 5,317,920
DATED : June 7, 1994
INVENTOR(S) : James R. Kremidas

It is certified that error appears in the above-indentified patent and that said Letters Patent is hereby corrected as shown below:

Column 6, Line 36, please delete "have" and insert --has--.

Column 7, Line 33, please delete "gage" and insert --gauge--.

Column 7, Line 67, please delete "gage" and insert --gauge--.

Column 8, Line 2, please delete ".005 and .008" and insert --.0005 and .0008--.

Column 8, Line 52, please delete ".005 and .008" and insert --.0005 and .0008--.

Column 10, line 17, please delete ".005 and .008" and insert --.0005 and .0008--.

Signed and Sealed this

Twenty-seventh Day of December, 1994

Attest:

BRUCE LEHMAN

Attesting Officer — Commissioner of Patents and Trademarks